United States Patent [19]

Gottlieb et al.

[11] 4,203,326

[45] May 20, 1980

[54] METHOD AND MEANS FOR IMPROVED OPTICAL TEMPERATURE SENSOR

[75] Inventors: Milton Gottlieb; Gerald B. Brandt, both of Pittsburgh, Pa.

[73] Assignee: Electric Power Research Institute, Inc., Palo Alto, Calif.

[21] Appl. No.: 6,860

[22] Filed: Jan. 26, 1979

[51] Int. Cl.$^2$ .............................................. G01K 1/00
[52] U.S. Cl. ................... 73/339 R; 340/584; 356/44
[58] Field of Search ............... 73/339 R, 356, 355 R; 356/43, 44; 340/57, 584, 588

[56] References Cited

U.S. PATENT DOCUMENTS

| | | | |
|---|---|---|---|
| 3,051,038 | 8/1962 | Duke | 73/339 R |
| 4,016,761 | 4/1977 | Rozzell | 73/356 |
| 4,151,747 | 5/1979 | Gottlieb et al. | 73/339 R |

*Primary Examiner*—Donald O. Woodiel
*Attorney, Agent, or Firm*—Flehr, Hohbach, Test

[57] ABSTRACT

An improved optical fiber temperature sensor includes at least one optical fiber light conductor including an optical fiber core, cladding material around the core, and a jacket surrounding the core and cladding material. The core exhibits an evanescent field which extends through the cladding material into the jacket in a first selected range of optical wavelengths. Light attenuation in the conductor below a first temperature range is less than light attenuation above the temperature range. By applying light to the conductor at a frequency with the selected optical wavelength range and detecting the light passed through the conductor, an approximate temperature within the temperature range can be sensed. A more accurate temperature can be sensed by using either two optical fiber light conductors having different optical properties or by using two light frequencies with a single conductor which responds differently to the two frequencies.

8 Claims, 10 Drawing Figures

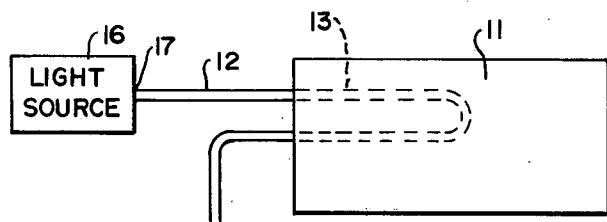
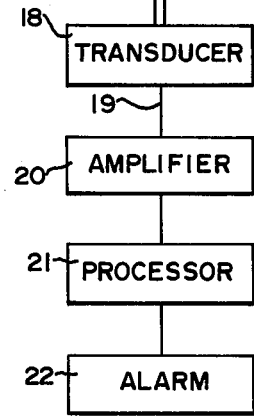
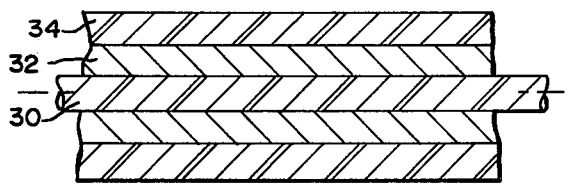
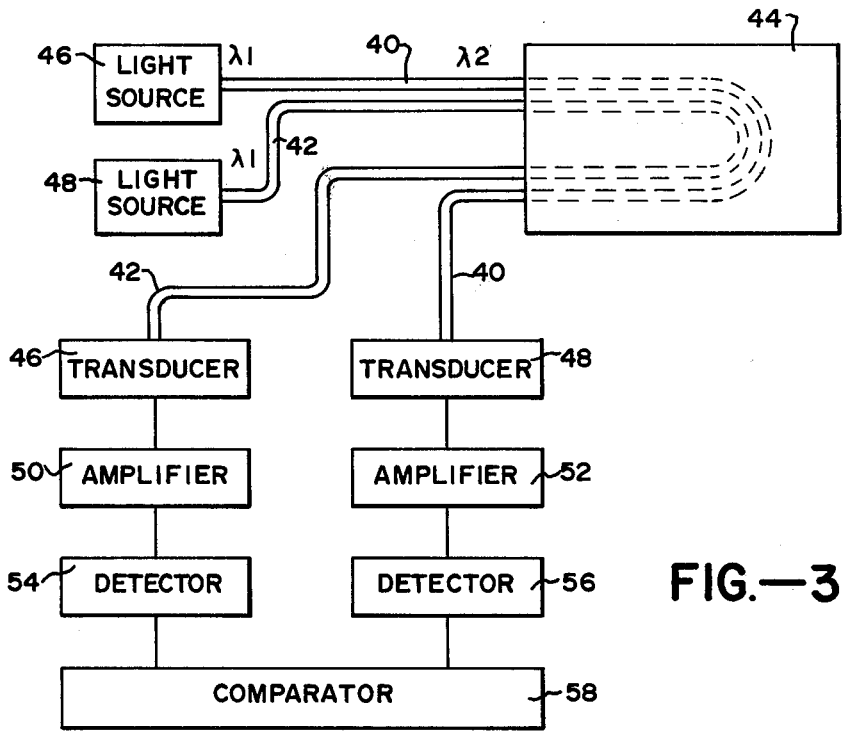

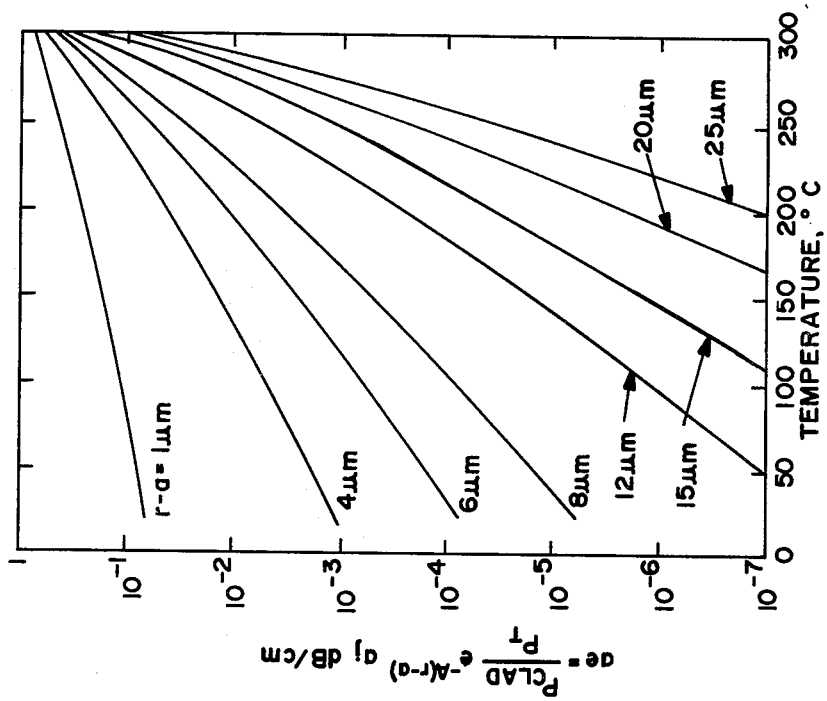
FIG.—5
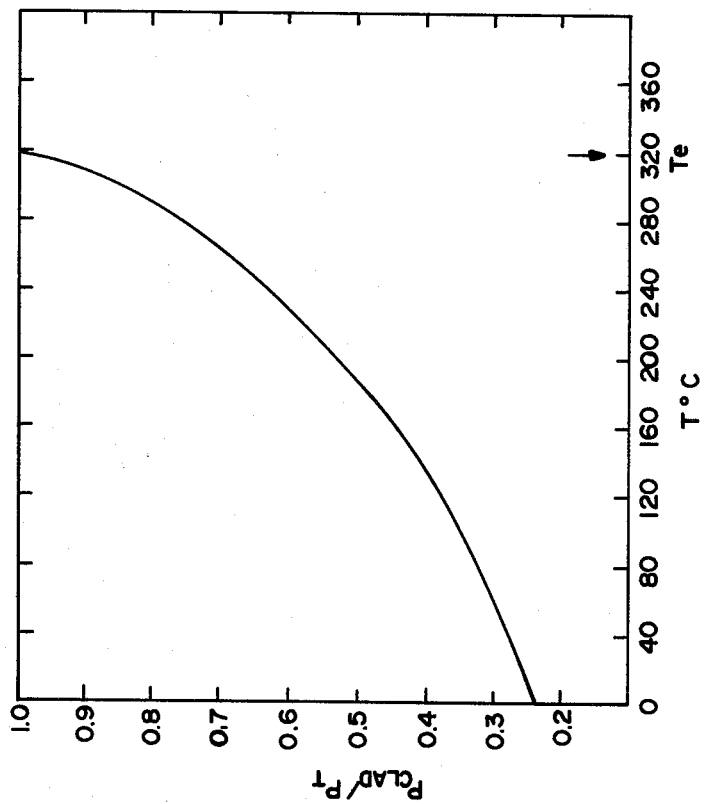
FIG.—4

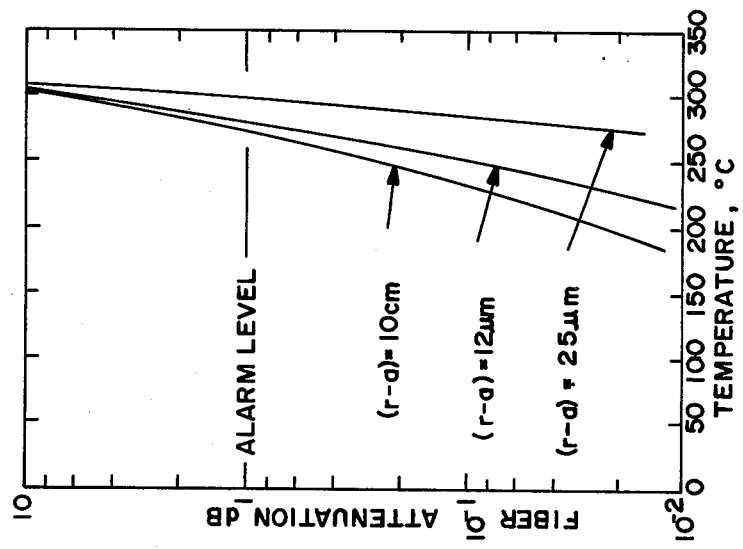
FIG.—8
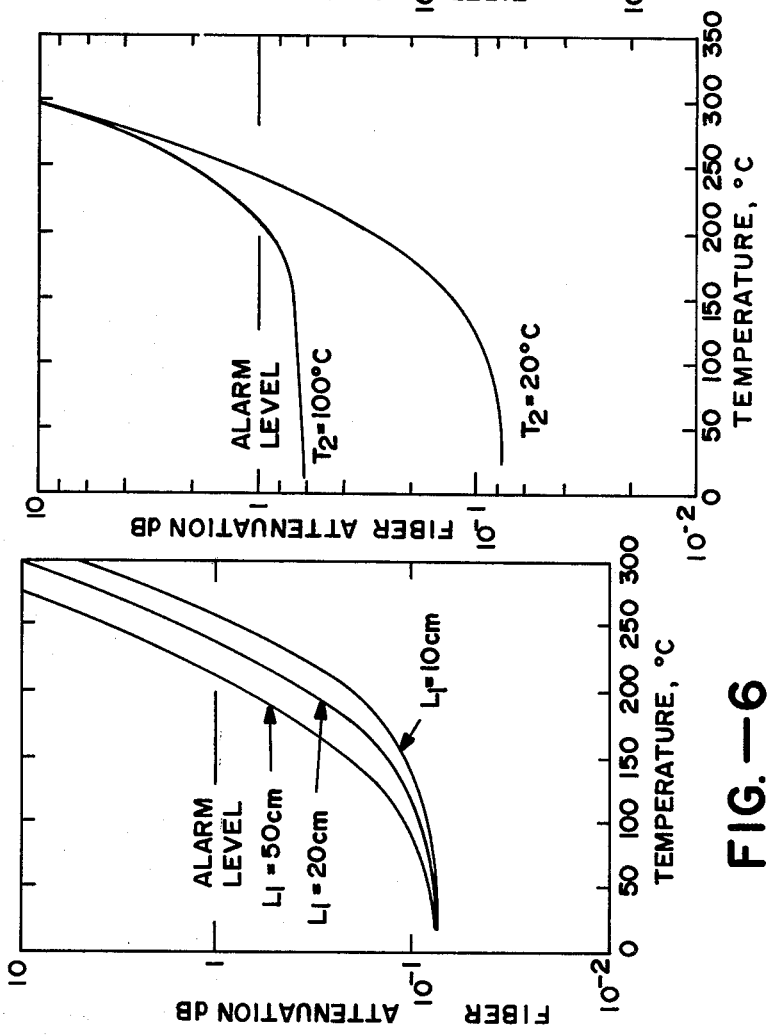
FIG.—7
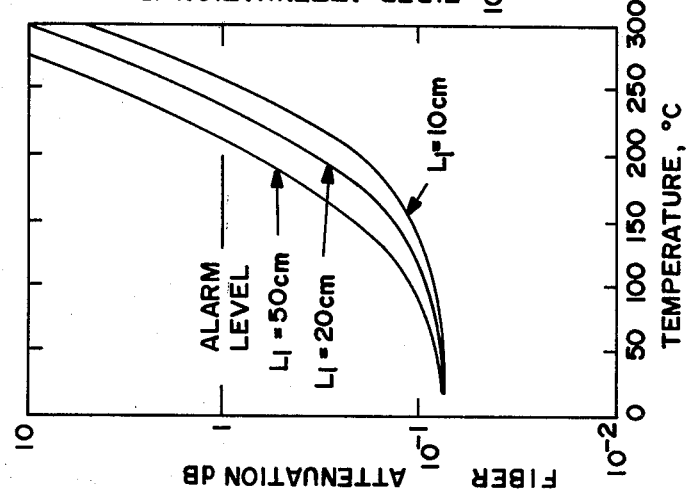
FIG.—6

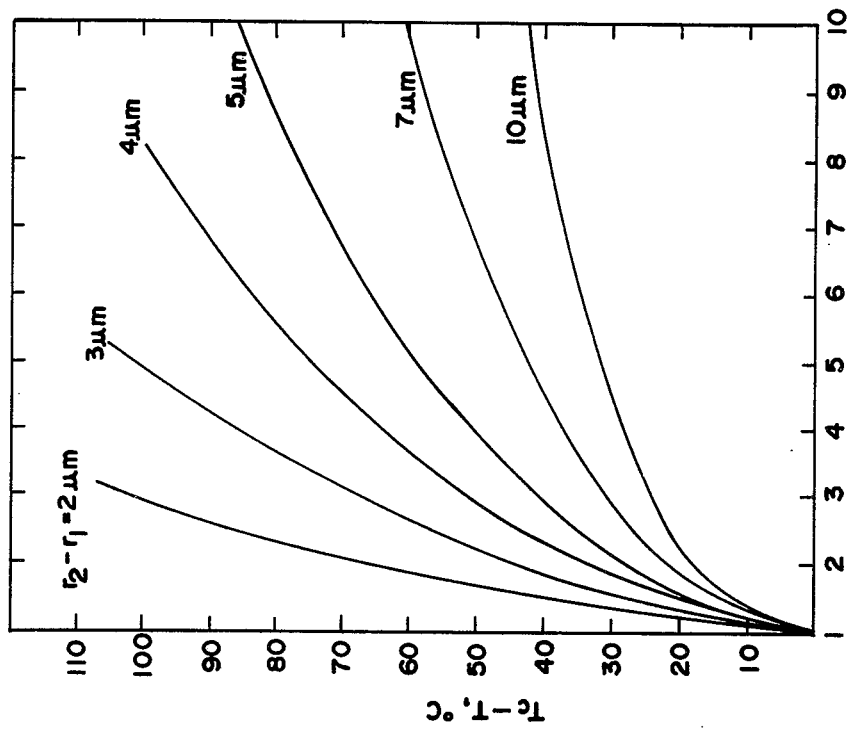
FIG.—10
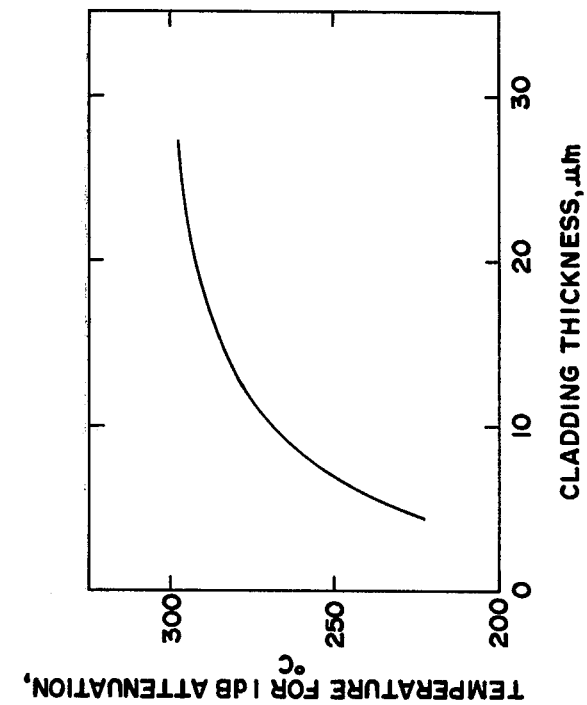
FIG.—9

METHOD AND MEANS FOR IMPROVED OPTICAL TEMPERATURE SENSOR

This application is related to applicants' copending application Ser. No. 917,496 filed June 21, 1978, for Monitoring Arrangement Utilizing Fiber optics, now U.S. Pat. No. 4,151,747.

This invention relates generally to temperature sensors utilizing optical conductors, and more particularly the invention relates to an improved method and means for optically sensing a temperature in an environment where temperature sensing is relatively independent of length of the optical conductor.

A number of sensors are available for measuring temperature in a remote environment. However, certain environments present conditions where the conventional electrical thermocouple and like devices which utilize metallic leads and applied voltages cannot be safely or conveniently employed. For example, high RF noise background and explosive atmospheres may make electrical measurements impossible. Further, electrical sensors are limited to measuring temperature at a discrete point within the environment.

Optical fiber sensors have been proposed for use in sensing temperatures in such environments, particularly where only the existence of a hot spot within the environment and not its position needs be known. For example, copending application Ser. No. 846,713, filed Oct. 31, 1977, for Optical Fibre Temperature Sensing System discloses an optical sensor including a fiber optic conductor which is placed in an environment such as an electrical transformer. A light source applies light to one end of the conductor and detector means senses the light at the other end. Thermal disruption of the conductor such as by melting the optical fiber core or the cladding surrounding the core interrupts the light path. By selecting the core and cladding material according to desired thermal characteristics, the presence of hot spots at critical temperatures within the enviromment can be detected.

In applicants' copending application Ser. No. 917,496, supra, a temperature monitoring arrangement is disclosed which employs a fiber optic sensor including a lossless core with light attenuating cladding material surrounding the core. By selecting material for the cladding which has a lower refraction index than the core material, light will pass through the length of the core with little or no attenuation at lower temperature. However, an evanescent field of the transmitted wave does extend into the cladding material. Moreover, the refraction index of the cladding increases faster with temperature increase than does refraction index of the core material, and as the cross-over point for the two refraction indices is approached, the evanescent field increases, resulting in increasing attenuation of the transmitted light due to attenuation in the cladding material. Thus, by measuring the light attenuation a temperature sensor is provided which is not self-destructive.

However, the use of a continuous fiber sensor in which changes in temperature cause variations in the amount of light absorbed in the fiber or cladding has several limitations. First, in order to achieve good sensitivity to temperature change over short lengths, the absorption constant of the cladding material must be so high that the insertion loss of the fiber will be excessive. The second difficulty arises because such a sensor generally has a linear response with respect to length and temperature rise. Thus, if the length of conductor exposed to the high temperature region is not known, it is not possible to determine the actual temperature.

An object of the present invention is a method and apparatus for optically measuring temperature rise in an environment which is relatively independent of the length of the conductor over which the temperature rise occurs.

Another object of the invention is an optical temperature sensor having low insertion loss in combination with good sensitivity to changes in temperature.

Still another object of the invention is a method for optically sensing temperature in an environment through use of an optical conductor which is independent of the background temperature experienced by the major portion of the optical conductor over a wide temperature range.

Briefly, in accordance with the present invention, an optical fiber temperature sensor includes at least one optical conductor which includes an optical fiber core, a clad material around the core, and a jacket surrounding the core clad material. The core exhibits an evanescent field which extends through the clad material into the jacket at first selected range of optical wavelengths. The cladding material and dimensions are selected whereby light loss in the cladding is negligible. The clad material and core material have a difference in refractive index which varies with temperature whereby light attenuation in the conductor below a first range of temperature is less than light attenuation in the conductor above the first temperature range. Light at a first wavelength within the first selected range of optical wavelengths is applied to one end of the conductor, and light at the first optical wavelength is detected at the other end of the conductor. By determining the light attenuation through the conductor at the first optical wavelength, a critical temperature range within the environment can be detected.

In an alternative embodiment, a second conductor of different cladding thickness can be provided in parallel with the first conductor through the environment, with the second conductor exhibiting an evanescent field extending into its jacket in a first range of optical wavelengths. By applying light at a first wavelength within the first optical wavelength range to one end of the second conductor and detecting light at the first optical wavelength at the other end of the conductor, determining the light attenuation through the second conductor at the same optical wavelength, and comparing the attenuation within the two conductors, a more exact temperature reading can be determined.

In another embodiment, light at a first wavelength and a second wavelength within the first range of optical wavelengths can be applied to one end of the first conductor with detector means detecting the amount of light at the first and second optical wavelengths at the other end of the conductor. By determining the light attenuation through the conductor at the first optical wavelength and the second optical wavelength, and comparing the light attenuation at the two wavelengths, a more exact temperature can be determined.

The invention and objects and features thereof will be more readily apparent from the following detailed description and appended claims when taken with the drawing.

FIG. 1 is a schematic diagram of an optical temperature sensor.

FIG. 2 is a section view of an optical fiber conductor useful in a temperature sensor in accordance with the present invention.

FIG. 3 is a schematic diagram illustrating several embodiments of an optical temperature sensor in accordance with the present invention.

FIG. 4 is a plot illustrating temperature dependence of optical power in the evanescent field to total optical power in an optical conductor in accordance with the present invention.

FIG. 5 is a schematic illustrating effective loss constant versus temperature for a conductor with different cladding thicknesses.

FIG. 6 is a plot of fiber attenuation versus temperature illustrating the temperature dependence of jacket loss fiber attenuation.

FIG. 7 is a plot of fiber attenuation versus temperature illustrating the temperature dependence of jacket loss fiber attenuation for two values of background temperature.

FIG. 8 is a plot of fiber attenuation versus temperature illustrating the dependence of jacket loss fiber attenuation for several cladding thicknesses.

FIG. 9 is a plot of temperature for a 1 db level of attenuation versus cladding thickness.

FIG. 10 is a plot illustrating the determination of temperature using two fibers of different cladding thicknesses.

Referring now to the drawings, FIG. 1 is a schematic of an optical fiber temperature sensing system. The environment 11 represents a transformer or generator whose temperature it is desired to monitor. An optical fiber 12 extends into the generator 11 and extends through the various areas whose temperatures it is desired to monitor. The dotted line 13 represents the locations where the temperature is being monitored by the optical fiber 12.

A light source 16 is employed to illuminate the one end 17 of the optical fiber. The light source 16 may for example be a light emitting diode disposed to illuminate the end of the optical fiber. The other end of the fiber is associated with a suitable phototransducer 18 which converts the light energy to electrical energy. The electrical energy travels along the line 19 to amplifier 20. The output of amplifier 20 is applied to a processor 21 which may be a level detector which detects the voltage level of the amplified signal. The output signal activates an alarm 22 which provides a suitable alarm such as a warning light or sound when the voltage level falls below a predetermined value.

FIG. 2 is a longitudinal section view of a portion of a fiber useful in describing an optical conductor for a temperature sensor in accordance with the present invention which has the capability of measuring temperature rise relatively independent of the length over which the temperature rise occurs and which is generally independent of background temperature seen by the major portion of the fiber length over a wide temperature range. The fiber includes a core 30, cladding material 32 surrounding the core 30, and a jacket 34 which surrounds the cladded core. The core and cladding typically comprises glass or plastic material of a different composition which is essentially lossless. The envelope may comprise glass or plastic with a composition which greatly attenuates light.

As disclosed in copending application Ser. No. 917,496, supra, a light beam is confined, or guided, in its propagation within the core, if the refracted index of the core is larger than the refractive index of the surrounding cladding. As long as the light beam is incident to the core surface at an angle greater than the critical angle, $\theta_c = \sin^{-1} n(\text{clad})/n(\text{core})$, the light will be totally internally reflected, i.e., guided.

When the core diameter is small, on the order of one or several wave lengths of light, only one or a few discrete modes of propagation can be supported by the fiber. The properties of these distinct modes will be functions of the light wavelength, the core radius, and the refractive indices of the core and cladding material.

Another important feature of the fiber light guides is the capability of the light wave to penetrate beyond the physical boundary of the core. How the energy of this light is distributed between the core and the cladding will depend upon the mode and fiber parameters. The more weakly guiding the mode (the closer the mode is to cutoff), the greater will be the fraction of energy carried into the cladding. This particular aspect of propagation is utilized to monitor temperature utilizing an optical fiber as a temperature sensor.

In accordance with the present invention the radius of the cladded material is made sufficiently small so that the evanescent field of the core at the optical mode of operation extends through the cladding into the jacket. Further, by providing cladding which is essentially lossless, all of the attenuation takes place in the jacket. By changing the core and cladding index of refraction difference ($\Delta n$) the fraction of power coupled into the jacket can be controlled. Moreover, as described in copending application Ser. No. 917,496, supra, this coupling changes very abruptly with $\Delta n$, such that above a critical value of $\Delta n$ there is virtually no power loss at the jacket while below this critical value the loss increases very rapidly. As a consequence of this behavior, an optical temperature sensor can be designed combining good sensitivity with low background insertion loss (due to the low loss in the cladding material) and in which the optical power attenuation in the temperature range of interest occurs in the jacket and the power loss is critically temperature dependent.

FIG. 3 illustrates schematically several embodiments of an optical fiber temperature sensor and method in accordance with the invention. First and second optical conductors 40 and 42 are provided in an environment 44 such as an electrical power transformer or generator. A light source 46 is connected to supply light at either or both wavelengths, $\lambda_1$ and $\lambda_2$, to conductor 40, and light source 48 is connected to one end of conductor 42 for applying a light having a wavelength $\lambda_1$. The other ends of conductors 42 and 44 are connected to transducers 46 and 48, respectively, for converting the received light to an electrical signal. Transducer 46 provides an electrical signal to amplifier 50, and transducer 48 is interconnected to provide an electrical signal to amplifier 52. The output of amplifiers 50 and 52 are connected to detectors 54 and 56, respectively, which detect the level of the amplified signal. In one embodiment of the invention, the outputs of detectors 54 and 56 are compared in voltage comparator 58, and the comparison of the attenuated signals, and consequently the attenuation within the two conductors, is correlated to temperature.

In accordance with one embodiment of the method of optically sensing an approximate temperature in the environment 44, only a single light source 46 and single conductor 40 is required. The core of the conductor 40 is chosen to exhibit an evanescent field which extends into the jacket at known optical wavelengths. The clad material has sufficient thickness to minimize optical losses within the cladding material, and the core and cladding refraction index difference is temperature dependent whereby the fraction of power coupled into the jacket changes abruptly with temperature, as above described.

Light source 46 applies a light at wavelength $\lambda_1$ to one end of conductor 40, and transducer 48 receives the light at wavelength $\lambda_1$ at the other end of conductor 40. The signal from transducer 48 is passed through amplifier 52, and the voltage level of the amplified signal is detected by detector 56. By correlating the light attenuation to a known temperature range, the temperature within the environment 44 is determined for this temperature range.

As will be described further hereinbelow, using a single conductor and a single light wavelength will indicate a range of temperature, but due to actual tempeature dependence on background temperature of the environment and length of the conductor exposed to an elevated temperature, a critical temperature within the temperature range cannot be determined. In accordance with two alternative embodiments of the invention a more precise temperature figure within the critical temperature range is detected. In one embodiment, light source 46 can apply first and second wavelengths of light, $\lambda_1$ and $\lambda_2$ to a single conductor 40, and the transducer 48 generates two voltage levels corresponding to the frequency $\lambda_1$ and the frequency $\lambda_2$. The two signals are amplified and detected, and by comparing the attenuation levels for the two wavelengths, a precise temperature can be determined.

In accordance with another embodiment of the invention, light at the $\lambda_1$ wavelength is applied to conductors 40 and 42, respectively, with the light output from each conductor passed through transducers. The amplified voltages from the transducers are detected in detectors 54 and 56, and a comparison of the attenuation of the light within the two conductors ydiels a more precise temperature within the critical range for which the conductors have been designed. Importantly, the two conductors are provided with different cladding thicknesses whereby each conductor responds differently to the temperature within the critical temperature range. Thus, each conductor provides a different attenuation for a given temperature distribution. By taking the ratio of the two attenuations, a precise temperature within the critical temperature range is determined, as will be described hereinbelow with reference to FIG. 10.

Having now generally described the apparatus and method of temperature sensing in accordance with the invention, the actual design of specific sensors is effected from a mathematical analysis of the temperature response of the conductors in terms of the index of refraction of the material used, the dimensions of the core and cladding material, and other optical fiber parameters. In the following equations these symbols are employed:

a—core radius
r—cladding radius
E(a)—evanescent field at radius a
E(r)—evanescent field at radius r
$k = 2\pi/\lambda$
$\beta$—propagation constant of guided light mode
$n_{clad}$—refractive index of cladding material
n—refractive index of core material
$\Delta n = n - n_{clad}$
$P_{clad}/P_T$—ratio of optical power in cladding to total optical power
$\alpha_j$—loss constant of jacket material
$\alpha_3$—effective fiber loss constant
$T_c$—temperature at which core and cladding refractive indices cross over
$L_1$—length of fiber hot region
$L_2$—length of fiber at background temperature In order to calculate the attenuation due to loss in the jacket, it is necessary to calculate the fraction of power in a particular mode which is coupled into the jacket. The evanescent field of a mode of propagation constant $\beta$ in a core of radius $a$ decays exponentially outside the core according to the relation $$E(r) = E(a)\exp[-(\beta^2 - n^2_{clad}k^2)^{\frac{1}{2}} (r-a)],$$

where $r - a$ is the radial distance from the core boundary, and E(a) is the field at the boundary. Then the energy density decays as $$I(r) = I(a) \exp[-2(\beta^2 - n^2_{clad}k^2)^{\frac{1}{2}} (r-a)] =$$
$$I(a) \exp\left[ -\frac{4(r-a)}{\lambda} \{\beta^2/k^2 - n^2_{clad}\}^{\frac{1}{2}} \right]$$

This can be simplified for a single mode fiber and expressed as $$I(r) = I(a) e^{-A(r-a)},$$

in which the factor A contains all the remaining fiber parameters.

It can be shown that the fraction of the evanescent power which is *beyond* the radius r is $$e^{-A(r-a)}.$$

Since the fraction of the total optical power in the mode which is located in the evanescent field is $P_{clad}/P_T$, the fraction of the total mode power residing beyond the radius r is $$\frac{P_{clad}}{P_T} \cdot e^{-A(r-a)}.$$

In order to determine the temperature dependence of this fraction, an explicit relation for the dependence of A on n(T) and the other fiber parameters is required.

From a graphical analysis of the mode curve for a single mode fiber, we obtain $$A = \frac{4\pi}{\lambda} \left[ \frac{\beta^2}{k^2} - n^2 \right]^{\frac{1}{2}} =$$
$$\left[ \frac{267.9a}{\lambda^3} (2n\Delta n)^{3/2} - \frac{21.32}{\lambda^2} (2n\Delta n) \right]^{\frac{1}{2}}$$

Assuming that the core and cladding are perfectly lossless, and that the jacket loss constant is $\alpha_j$ dB/cm, the effective loss constant for the fiber is $$\alpha_e = \frac{P_{clad}}{P_T} e^{-A(T)(r-a)} \cdot \alpha_j,$$

where $r-a$ is the thickness of the cladding.

As a specific illustrative example, let $\Delta n = (T_c - T) \times 10^{-5} = (320 - T) \times 10^{-5}$, $n = 1.5$, $a = 2.54 \times 10^{-4}$ cm and $\lambda = 6.33 \times 10^{-5}$ cm. For this example $$A = [1.394 \times 10^{12} [(320T) \times 10^{-5}]^{3/2} - 1.5963 \times 10^{10} (320 - T) \times 10^{-5}].$$

The ratio $P_{clad}/P_T$ is shown for this example in the graph in FIG. 4.

$\alpha_e$ is now evaluated for various values of cladding thickness and temperature. The results for this calculation of $\alpha_e$ for a range of values of cladding thickness from 1 μm to 25 μm are shown in FIG. 5. The jacket attenuation constant $\alpha_j = 1$ dB/cm has been chosen for convenience in the calculations, but other values could be chosen. It is obvious from these curves that the cladding thickness exerts a very strong influence on the temperature response of the fiber at lower temperatures, but much less influence at the higher temperatures. The important aspects of these temperature response curves are as follows. The insertion loss of the low temperature region of the fiber, even if it is relatively long, can be kept very low by choosing the cladding thickness to be sufficiently large. As the temperature of the hot region approaches $T_c = 320°$ C., the sensitivity becomes high, as all the curves converge to unity at $T_c$. If it is possible to select fibers with different corssover temperatures, as well as different cladding thicknesses and jacket losses, then there is a great deal of flexibility available in designing a temperature monitor. For example, since $\alpha_e$ can be kept very low at low temperatures, the insertion loss of any length of fiber can be kept below some threshold value, so that the monitor could be used as an alarm device as the threshold temperature region is reached. The operation of a jacket loss fiber can be better understood by considering some specific examples. Assume a fiber with the parameters of FIG. 5, and $L = L_1 + L_2 = 1000$ cm, where $L_1$ is the length of the hot region, and $L_2$ is the length of the background region. As a first case, suppose $L_1$ is known to be 20 cm, then if $r - a$ is chosen to be 6 μm, the fiber response shown in FIG. 6 is obtained, which represents the total attenuation for a 1000 cm long fiber with a jacket attenuation constant of 1 dB/cm. From the $L_1 = 20$ cm curve it is seen that for temperatures below 240° C., there is essentially no loss (<1 dB), but that between 240° C. and 300° C., the loss increased by 10 dB. Thus, this configuration could be used either as an alarm point of $T \approx 250°$ C., or as a thermometer between 240° C. and 300° C. In this range, the sensitivity is approximately 0.17 dB/°C.

Suppose instead of the simple case above, the length of the high temperature region is now known. The attenuation curves for $L_1 = 10$ cm and $L_1 = 50$ are also shown in FIG. 6. From this set of curves it can be seen that the alarm temperature is not a sensitive function of $L_1$. The 1 dB loss temperature varies only from 215° C. for $L_1 = 50$ cm, to 270° C. for $L_1 = 10$ cm. For systems not requiring an alarm temperature specified more closely than this, it will not be necessary to know the length of $L_1$ between these limits. In addition, if the background temperature over the region $L_2$ rises significantly above 20° C., the overall attenuation will not be greatly affected. This point is illustrated by the two curves in FIG. 7, which shows the attenuation for which the high temperature region is 20 cm, and the background temperature, $T_2$, is 20° C. for one curve and 100° C. for the other curve. The 1 dB threshold temperature is 240° C. for the former, and 210° C. for the latter.

For temperatures above the 1 dB value, the difference between the two becomes smaller and smaller. Thus, such a fiber could be used to detect a hot spot ($T_1 > 210°$ C.) when the background temperature is unknown, up to 100° C. It is possible to make the thresold temperature higher, and even more sharply defined, by choosing larger values of the cladding thickness. The fiber attenuation is shown in FIG. 8 for 3 larger values of $r - a$, 10 μm, 12 μm and 25 μm; over this range, the threshold temperature increases from 268° C. to 300° C. This is summarized in FIG. 9, in which is plotted the temperature for 1 dB attenuation as a function of cladding thickness. This temperature can be varied between about 200° C. and 300° C. for cladding thickness between about 3 μm and 30 μm.

An analytic expression can be derived for the relation between the cladding thickness and the threshold temperature for an arbitrarily chosen value of alarm attenuation. Instead of specifying 1 dB, let $\alpha_a$ represent the alarm attenuation. The length of the high temperature region is specified as $L_1$, but, as we have seen the results are not sensitive to this length. If the contribution to the attenuation from the low temperature region is ignored, then $$\alpha_a = \alpha_e L_1$$
$$= \frac{P_{clad}}{P_T} e^{-A(r-a)} \alpha_j L_1,$$

where $P_{clad}/P_T$ and $A$ are functions of temperature, previously given. Solving this for the cladding thickness, $$(r - a) = \frac{1}{A} \ln \left[ \frac{P_{clad}}{P_T} \frac{\alpha_j L_1}{\alpha_a} \right]$$

$$= \frac{1}{A} \left[ \ln \frac{P_{clad}}{P_T} - \ln \frac{\alpha_j L_1}{\alpha_a} \right].$$

For given fiber parameters the temperature may be determined within certain error limits if the length of the hot region is not known to within a set of limits. This was illustrated in FIG. 6, which shows that if $L_1$ can only be specified to between 10 cm and 50 cm, there is an uncertainty in the temperature of about 50° C. The greater the uncertainty in $L_1$, the greater will be the uncertainty in the temperature. As above described this uncertainty can be further narrowed if two fibers are used, with different cladding thicknesses, to make the determination. In this case, the two fibers, covering the identical path, each suffer a different attenuation for a given temperature distribution. By taking the ratio of the two attenuation,s it will be possible to accurately specify the temperature.

The formulation for the two fiber measurement is as follows. As described above, the fiber parameters can be chosen so that the contribution to the attenuation from the long, background temperature region can be neglected compared to the contribution from the high temperature, if $T_2$ is less than approximately 100° C. This can be seen from the curves in FIG. 7. Then the attenuation measured in two fibers can be expressed as $$\alpha_1 = \alpha_j \frac{P_{clad}(T)}{P} e^{-A(T)(r_1 - a)L_1}$$

-continued
and
$$\alpha_2 = \alpha_j \frac{P_{clad}(T)}{P_T} e^{-A(T)(r_2-a)L_1}.$$

If both fibers have the same core diameter and $\Delta n$, then $P_{clad}/P_t$ is the same for fiber 1 and 2. Taking the ratio of the two attenuations yields $$\frac{\alpha_1}{\alpha_2} = e^{-A(T)(r_1-r_2)}$$

or $$\ln \frac{\alpha_1}{\alpha_2} = A(T)(r_2 - r_1).$$

Using the previous expression for A(T) for a single mode fiber, $$\left(268 \frac{a}{\lambda^3} (2n\Delta n)^{3/2} - \frac{21.3}{\lambda^2} (2n\Delta n)\right)^{\frac{1}{2}} (r_2 - r_1) = \ln \frac{\alpha_1}{\alpha_2}.$$

If $\Delta n$ is chosen to have the same temperature coefficient as in the previous example, then $\Delta n(T)=(T_c-T)\times 10^{-5}$.

The equation can be solved for T by making some substitutions. Let $$Y=(2n\Delta n)^{\frac{1}{2}}$$

$$m=268(a/\lambda^3)$$

$$g=21.3/\lambda^3$$

and $$h = \left[\frac{\ln \frac{\alpha_1}{\alpha_2}}{r_2 - r_1}\right]^2$$

with these substitutions, $$Y^3 - \frac{g}{m} Y^2 - \frac{h}{m} = 0.$$

This is a cubic equation for which there will be, in general, one real root, R, $$Y=(2n\Delta n)^{\frac{1}{2}}=R$$

$$\Delta n=(T_c-T)\times 10^{-5}=R^2/2n,$$

and finally $$T=T_c-R^2/2n\times 10^5.$$

In order to illustrate this relationship, the parameters for the single mode fiber are chosen as $n_c=1.5$, $a=2.54\times 10^4$ cm and $\lambda=6.33\times 10^{-5}$ cm. The equation relating Y, $\alpha_1/\alpha_2$ and $r_2-r_1$ is $$Y^3 - 2\times 10^{-2}Y^2 - 3.73\times 10^{-12}\left[\frac{\ln \alpha_1/\alpha_2}{r_2 - r_1}\right]^2 = 0.$$

The solutions to this equation are shown in FIG. 10, in which $T_c-T$ is plotted vs. $\alpha_1/\alpha_2$, for different values of $r_2-r_1$. Once the crossover temperature, $T_c$, and the difference in cladding thickness, $r_2-r_1$, have been specified, this set of curves can be considered a calibration for the pair of fibers, in which the temperature reading is independent of the length $L_1$ over which this temperature is established, and relatively insensitive to the background temperature of the remainder of the fiber length.

Similar to eliminating the dependence upon the length of the hot region by taking the ratio of transmission in two fibers of different cladding thickness, it is also possible to eliminate the length dependence in a single fiber by measurement of the attenuation ratio for two wavelengths. The formulation for the two wavelength measurement is as follows. Suppose the attenuations measured at wavelengths $\lambda_1$ and $\lambda_2$ are $$\alpha_1 = \frac{P(T)}{P_T} \alpha_j e^{-(268a/\lambda_1^3\ Y^3 - 21.3/\lambda_1^2\ Y)(r-a)} L$$

and $$\alpha_2 = \frac{P(T)}{P_T} \alpha_j e^{-(268a/\lambda_2^3\ Y^3 - 21.3/\lambda_2^2\ Y)(r-a)} L,$$

respectively, where the fiber parameters are the same as in the previous example. The ratio of the two attenuations is $$\frac{\alpha_1}{\alpha_2} =$$

$$\exp\left[-268a \frac{\lambda_2^3 - \lambda_1^3}{\lambda_1^3 \lambda_2^3} Y^3 + 21.3 \frac{\lambda_2^2 - \lambda_1^2}{\lambda_1^2 \lambda_2^2} Y\right](r-a).$$

The solution proceeds as for the two fiber measurement, leading to the equation $$Y^3 - \frac{0.0795}{a} \cdot \frac{\lambda_1\lambda_2(\lambda_2^2 - \lambda_1^2)}{(\lambda_2^3 - \lambda_1^3)} Y - \frac{1}{268(r-a)} \frac{\lambda_1^3\lambda_2^3}{\lambda_2^3 - \lambda_1^3} \ln \frac{\alpha_1}{\alpha_2} = 0.$$

Again this is a cubic equation with one real root $Y=R=(2n\Delta n)^{\frac{1}{2}}$, from which the temperature can be extracted. The coefficients of the cubic equation contain only the known parameters a, r, $\alpha_1$, $\alpha_2$, $\lambda_1$ and $\lambda_2$. The dependence on length has again been completely removed.

While the invention has been described with reference to specific embodiments, the description is illustrative and is not to be construed as limiting the invention. Various modifications and applications may occur to those skilled in the art without departing from the true spirit and scope of the invention as defined by the appended claims.

What is claimed is:

1. The method of optically sensing an approximate temperature in an environment comprising the steps of:
   (a) providing a first optical fiber-light conductor through said environment, said conductor having a first end and a second end and including an optical fiber core, a clad material around said core, and a jacket surrounding said core and clad material, said core exhibiting an evanescent field extending through said clad material into said jacket at selected optical wavelengths, said clad material having a thickness whereby light attenuation in said conductor below a first range of temperature is less than light attenuation in said conductor above said first temperature range, (b) applying light at a first wavelength within said selected range of optical wavelengths to one end of said conductor, (c) detecting light at said first optical wavelength at the other end of said conductor, and (d) determining the light attenuation through said conductor at said first optical wavelength.

2. The method of optically sensing an approximate temperature in an environment as defined in claim 1 and further including the steps of:

(e) applying light at a second wavelength within said selected optical wavelengths to one end of said conductor, (f) detecting light at said second optical wavelength at the other end of said conductor, (g) determining the light attenuation through said conductor at said second optical wavelength, and (h) comparing the light attenuation at said first wavelength to the light attenuation at said second wavelength.

3. The method of optically sensing an approximate temperature in an environment as defined by claim 1 and further including the steps of:

(e) providing a second optical fiber-light conductor through said environment and parallel with said first optical fiber, said second conductor having a first end and a second end and including an optical fiber core, a clad material around said core, and a jacket surrounding said core and clad material, said core exhibiting an evanescent field extending into said jacket at second selected range of optical wavelengths, said clad material having a thickness whereby light attenuation in said conductor below a second range of temperature is less than light attenuation in said conductor above said second range of temperature;

(f) applying light at a second wavelength within said second selected range of optical wavelength to one end of said second conductor, (g) detecting light at said second optical wavelength at the other end of second conductor, (h) determining the light attenuation through said conductor at said second wavelength, and (i) comparing the light attenuation at said first wavelength through said first conductor to the light attenuation at said second wavelength through said second conductor.

4. The method as defined by claim 3 wherein said first wavelength and said second wavelength are the same.

5. An optical fiber temperature sensor for use in sensing an approximate temperature in an environment by detecting changes in attenuation of light comprising an optical fiber light conductor having a first end and a second end and including an optical fiber core, cladding material around said core, and a jacket surrounding said core and said cladding material, said core exhibiting an evanescent field which extends through said cladding material into said jacket at first selected range of optical wavelengths, said cladding material having a thickness whereby light attenuation in said conductor below a first temperature range is less than light attenuation in said conductor above said first temperature range, a light source for applying light at a first wavelength within said selected range of optical wavelengths to one end of said conductor, and detector means for detecting light at said first optical wavelength at the other end of said conductor.

6. An optical fiber temperature sensor as defined by claim 5 and further including a second optical fiber light conductor in parallel with said first optical fiber light conductor, said second conductor including an optical fiber core, a clad material around said core, and a jacket surrounding said core and clad material, said core exhibiting an evanescent field which extends into said jacket at second selected range of optical wavelengths, said clad material having a thickness different from the clad material thickness of said first conductor whereby light attenuation in said conductor below a second temperature range is less than light attenuation in said conductor above said second temperature range, a light source for applying light at a wavelength within said second selected range of optical wavelengths to one end of said second conductor, detector means for detecting light at said second optical wavelength at the other end of said second conductor, and means for comparing the light attenuation at said first wavelength in said first conductor to the light attenuation at said second wavelength in said second conductor.

7. An optical fiber temperature sensor as defined by claim 6 wherein said first optical wavelength and said second optical wavelength are the same.

8. An optical fiber temperature sensor as defined by claim 5 wherein said light source applies light at a plurality of wavelengths to one end of said conductor, and said detector means detects light at said plurality of wavelengths at the other end of said conductor, and further including means for comparing the attenuation of light at said first wavelength and the attenuation of light at said second wavelength in said first conductor.

* * * * *